(No Model.)
I. B. POTTS.
COMBINED DETACHABLE PIPE COUPLING AND BRANCH.
No. 407,682. Patented July 23, 1889.
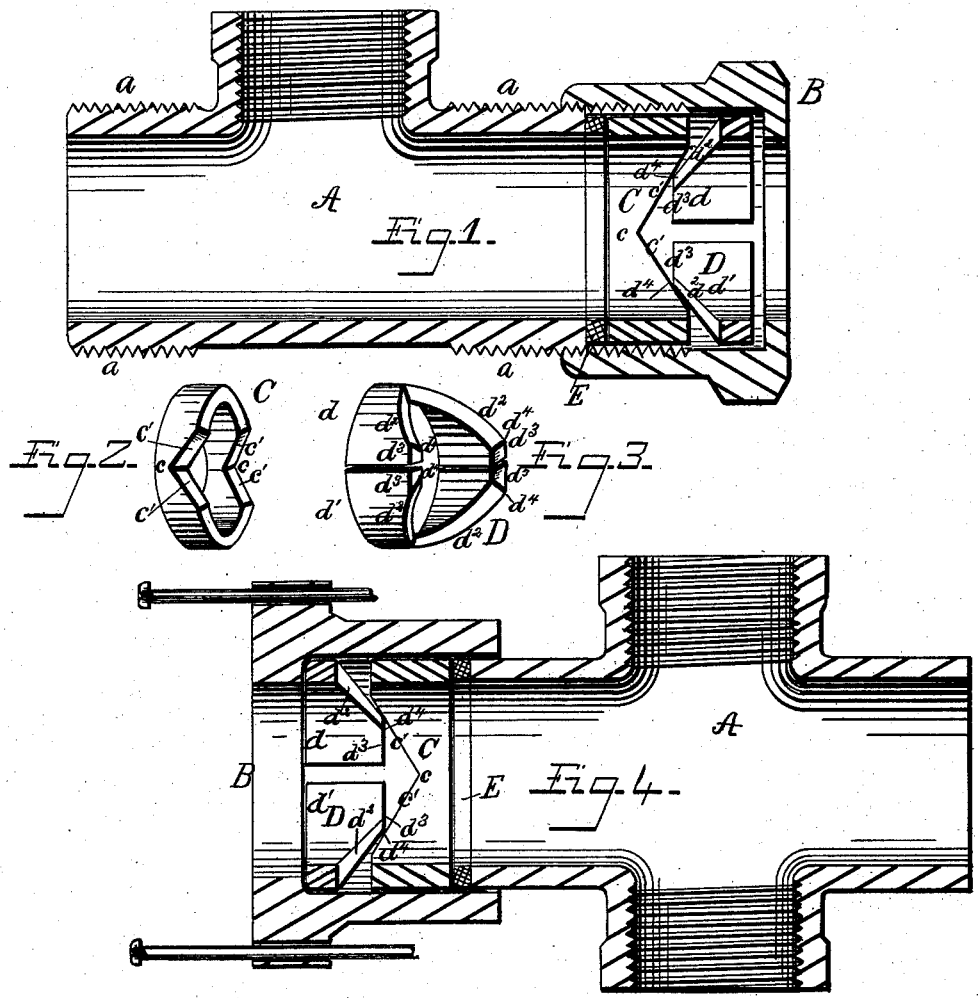

UNITED STATES PATENT OFFICE.

ISAAC B. POTTS, OF COLUMBUS, OHIO.

COMBINED DETACHABLE PIPE COUPLING AND BRANCH.

SPECIFICATION forming part of Letters Patent No. 407,682, dated July 23, 1889.

Application filed March 25, 1889. Serial No. 304,753. (No model.)

*To all whom it may concern:*

Be it known that I, ISAAC BROADWORTH POTTS, a citizen of the United States, residing at Columbus, in the county of Franklin and State of Ohio, have invented a new and useful Improvement in Combined Detachable Pipe Couplings and Branches, of which the following is a specification.

My invention is an improvement in a combined detachable pipe coupling and branch, angle or cross branch; and the object of my said invention is to provide a branch, angle or cross branch for pipes, that may be applied in position without screw-threads, solder, or wipe-joints; and to this end I proceed as follows, reference being had to the accompanying drawings, forming a part hereof, and wherein—

Figure 1 is a view in vertical central longitudinal sectional elevation of a combined detachable pipe coupling and branch constructed according to my invention, and Figs. 2 and 3 detail detached views of the follower and clamping-rings employed therein. Fig. 4 is a view, similar to Fig. 1, of a cross branch and the same form of coupling as that shown in Fig. 1.

As now usually made, the branches, angle or cross branches for pipes are made with a female thread at each end to receive the ends of the pipe, which were screwed into said ends. In my invention these female screw-threads in the interior of the extremities of the branch are omitted, and in this instance the exterior of the extremities of the branch are screw-threaded to receive a coupling-nut. The cutting of screw-threads upon the ends of the pipe to be united is therefore by my invention avoided, as well as the use of solder or wipe-joints, so that the work of applying a branch in pipes may be quickly and easily accomplished and without the employment of skilled labor. To accomplish these results, I proceed as follows:

A is the union, which, as in Fig. 1, may be a branch—that is, with a single lateral opening for the attachment of a branch pipe—or, as in Fig. 4, a cross-branch—that is, with pipe-openings upon opposite sides—or it may be an angle branch; and the extremities of this union are either screw-threaded, as at $a$, Fig. 1, or formed with a flange, or without either screw-thread or flange, as in Fig. 4. To these ends of the union the pipe to be united is secured, and in the present instance this is effected by a coupling-nut B. Within this nut B and upon the pipe being coupled is a follower C and a split clamping-ring D.

E is the packing. The follower C is, as shown in Fig. 2, in the form of a ring, and upon opposite sides thereof are formed notches or angular recesses $c$. The clamping-ring D is, as shown in Fig. 3, divided or in two parts, as at $d$ $d'$, and upon opposite sides thereof are formed projections or inclined portions $d^2$, which terminate in straight shoulders, as at $d^3$. By this construction, when the clamp D is brought up against the follower C by the nut B there are four points of contact, as at $d^4$, between the ring and follower; and because of the inclined surfaces $c'$ of the recesses $c$ of the follower C riding upon the incline projections $d^2$ of the clamp D said clamp is compressed around and upon the pipe being coupled, and at the same time the follower C is compressed against the packing E at the end of the union. The parts are therefore rigidly secured together.

Although having described this particular form of coupling for uniting the pipe to the combined union and branch, yet I do not wish to be understood as limiting myself to such coupling, as any other suitable form thereof may be used to accomplish the desired result—that of securing the pipe to the union—as, for instance, such a coupling where the end of the union is not screw-threaded, but is formed with a flange, through which and the coupling-head passes bolts, or, as in Fig. 4, where both flange and screw-thread are omitted, the bolts in this instance passing through the flanged coupling-head at each extremity of the union.

By providing the union with branch openings, as shown, the same is adapted for use as a branch as well as pipe coupling, so that the operation of inserting branches in pipe may be quickly accomplished without the employment of skilled labor and without cutting screw-threads upon the pipe or using solder or wipe-joints.

Having thus described my invention, I claim therein as new and of my invention—

The combination, with the combined union and branch into which the ends of the pipe to be coupled are inserted, of the follower-ring C, formed with recess $c$ upon each side, having inclined surfaces $c'$, split clamp D, having inclined projections $d^2$ upon opposite sides, packing-ring E, adjacent the end of the union, and suitable means for applying power to said clamp, for the purposes specified.

ISAAC B. POTTS.

In presence of—
WM. H. BRERETON,
HARVEY S. W. DE GAW.